United States Patent
TenHouten et al.

(10) Patent No.: US 11,479,015 B2
(45) Date of Patent: Oct. 25, 2022

(54) CUSTOM FORMED PANELS FOR TRANSPORT STRUCTURES AND METHODS FOR ASSEMBLING SAME

(71) Applicant: DIVERGENT TECHNOLOGIES, INC., Los Angeles, CA (US)

(72) Inventors: Broc William TenHouten, Los Angeles, CA (US); Narender Shankar Lakshman, Los Angeles, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 50 days.

(21) Appl. No.: 16/792,048

(22) Filed: Feb. 14, 2020

(65) Prior Publication Data
US 2021/0252825 A1    Aug. 19, 2021

(51) Int. Cl.
| | |
|---|---|
| B33Y 80/00 | (2015.01) |
| B32B 5/18 | (2006.01) |
| B32B 5/24 | (2006.01) |
| E04C 1/00 | (2006.01) |
| E04C 2/38 | (2006.01) |

(52) U.S. Cl.
CPC ............ *B32B 5/18* (2013.01); *B32B 5/245* (2013.01); *B32B 2305/022* (2013.01); *B32B 2607/00* (2013.01); *B33Y 80/00* (2014.12); *E04C 1/00* (2013.01); *E04C 2/38* (2013.01)

(58) Field of Classification Search
CPC . E04C 2/38; E04C 2/322; E04C 2/296; E04C 2/324; E04C 2/243; E04C 2/34; E04C 2/3405; B32B 2305/022; B33Y 80/00
See application file for complete search history.

(56) References Cited

U.S. PATENT DOCUMENTS

| | | | |
|---|---|---|---|
| 3,110,961 A | 11/1963 | Melill et al. | |
| 5,203,226 A | 4/1993 | Hongou et al. | |
| 5,245,809 A * | 9/1993 | Harrington | ............... B32B 5/20 52/309.11 |

(Continued)

FOREIGN PATENT DOCUMENTS

| | | |
|---|---|---|
| WO | 1996036455 A1 | 11/1996 |
| WO | 1996036525 A1 | 11/1996 |

(Continued)

OTHER PUBLICATIONS

US 9,202,136 B2, 12/2015, Schmidt et al. (withdrawn)

(Continued)

*Primary Examiner* — Adriana Figueroa
(74) *Attorney, Agent, or Firm* — ArentFox Schiff LLP

(57) ABSTRACT

Techniques for providing custom formed panels for transport structures including vehicles and aircraft are disclosed. In one aspect of the disclosure, a panel for a transport structure includes a first face sheet, a second face sheet arranged opposite the first face sheet, the second face sheet comprising a different geometrical profile than the first face sheet to define a space between the first and second face sheets having a variable thickness, a core configured to occupy the space. In another aspect, a node can be additively manufactured to form the custom panels by engaging opposing face sheets. The node has an inlet port for providing a foam-like substance into the space between the face sheets to thereafter solidify into a core.

7 Claims, 11 Drawing Sheets

(56) References Cited

U.S. PATENT DOCUMENTS

| | | |
|---|---|---|
| 5,742,385 A | 4/1998 | Champa |
| 5,990,444 A | 11/1999 | Costin |
| 6,010,155 A | 1/2000 | Rinehart |
| 6,096,249 A | 8/2000 | Yamaguchi |
| 6,140,602 A | 10/2000 | Costin |
| 6,250,533 B1 | 6/2001 | Otterbein et al. |
| 6,252,196 B1 | 6/2001 | Costin et al. |
| 6,318,642 B1 | 11/2001 | Goenka et al. |
| 6,365,057 B1 | 4/2002 | Whitehurst et al. |
| 6,391,251 B1 | 5/2002 | Keicher et al. |
| 6,409,930 B1 | 6/2002 | Whitehurst et al. |
| 6,468,439 B1 | 10/2002 | Whitehurst et al. |
| 6,554,345 B2 | 4/2003 | Jonsson |
| 6,585,151 B1 | 7/2003 | Ghosh |
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,540,123 B1 | 6/2009 | Semmes |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,340,972 B2 * | 5/2016 | Naidoo ............ E04C 2/384 |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwarzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Garni et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaalliausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |

(56) References Cited

U.S. PATENT DOCUMENTS

| | | |
|---|---|---|
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |

(56) References Cited

U.S. PATENT DOCUMENTS

| | | |
|---|---|---|
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,385,562 B2 * | 8/2019 | Moss .................... E04C 2/292 |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 10,563,400 B2 * | 2/2020 | Graham .................... B32B 3/06 |
| 2006/0108783 A1 | 5/2006 | Ni et al. |
| 2010/0266808 A1 | 10/2010 | Klein et al. |
| 2014/0157710 A1 * | 6/2014 | Potter .................... E04C 2/049 52/582.1 |
| 2014/0277669 A1 | 9/2014 | Nardi et al. |
| 2016/0237683 A1 * | 8/2016 | Husin-Ali ................ E04B 1/14 |
| 2017/0113344 A1 | 4/2017 | Schönberg |
| 2017/0341309 A1 | 11/2017 | Piepenbrock et al. |
| 2018/0218723 A1 | 8/2018 | Lin et al. |
| 2018/0319121 A1 | 11/2018 | Waldrop, III et al. |
| 2019/0226204 A1 | 7/2019 | Visser |
| 2019/0351641 A1 | 11/2019 | Massey, Jr. |

FOREIGN PATENT DOCUMENTS

| | | |
|---|---|---|
| WO | 1996038260 A1 | 12/1996 |
| WO | 2003024641 A1 | 3/2003 |
| WO | 2003/078752 A1 | 9/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

OTHER PUBLICATIONS

US 9,809,265 B2, 11/2017, Kinjo (withdrawn)
US 10,449,880 B2, 10/2019, Mizobata et al. (withdrawn)
Partial Search Report, Form PCT/ISA/206, issued for corresponding International Application No. PCT/US21/18014, dated Oct. 5, 2021, 2 pages.
International Search Report and the Written Opinion, issued for corresponding International Application No. PCT/US21/18014, dated Dec. 10, 2021, 10 pages.

* cited by examiner

CUSTOM FORMED PANELS FOR TRANSPORT STRUCTURES AND METHODS FOR ASSEMBLING SAME

INCORPORATION BY REFERENCE

Applicant incorporates by reference, as if fully set forth herein, U.S. patent application Ser. No. 15/853,301 filed Dec. 22, 2017, entitled "Methods and Apparatus for Forming Node to Panel Joints" and assigned to the present Applicant.

BACKGROUND

Field

The present disclosure relates generally to the assembly of vehicles and other transport structures, and more specifically to techniques for assembling custom-formed panels for a variety of applications.

Background

Panels incorporating a wide variety of sizes, shapes and other physical characteristics are commonly used in the assembly of transport structures such as vehicles, trains, motorcycles, sea vessels, submarines, spacecraft, aircraft and the like. These include interior and exterior panels. They also include panels for enclosing a space and body panels designed to bear structural loads. Sandwich panels, which include outer face sheets adhered to an inner core, are used both in low density applications and in applications in which high structural rigidity is imperative. To accommodate this range of applications, traditional panels may accordingly be designed with different geometries, may embody different material compositions (e.g., single ply panels versus sandwich panels, etc.), and may include different physical characteristics such as density, ductility, rigidity, tensile strength, and so on.

As the demand for more sophisticated and varied panel geometries increases, more complex tooling is required, and tooling and labor expenses become increasingly relevant issues to the manufacturer. Sandwich panels are conventionally produced using traditional manufacturing techniques including dedicated molds and other equipment for producing panel cores and integrating face sheets onto opposing sides of the cores. The resulting panels produced using conventional casting equipment may often be uniformly flat, with a constant distance between the face sheets and a uniformly thick interior core structure for support.

Manufacturers in assembly-line environments often strive to minimize fabrication costs by attempting to limit the types of panels used in vehicles, sticking instead to those varieties that can be acquired at lower cost or that can be made using in-house tooling. Design flexibility and innovation can be compromised as a result.

Problems may also be encountered where design considerations reflect the need for longer panels using more intricate geometries, some of which may extend across a considerable portion of the transport structure. Attaching sandwich panel segments together end-to-end to achieve longer panels may require welding and labor processes that add time and labor to the overall assembly. Coupling panels together edgewise may also require high precision machining equipment, e.g., to connect panels of a new aircraft design together in a manner that avoids protrusions or other discontinuities that tend to produce aerodynamic drag.

There is a need in the art to develop a fundamentally new assembly infrastructure for efficiently and quickly assembling new panel designs without the aforementioned limitations.

SUMMARY

Custom formed panels in accordance with several aspects of the disclosure will be described more fully hereinafter.

One aspect of a panel includes a first face sheet, a second face sheet arranged opposite the first face sheet, the second face sheet including a different geometrical profile than the first face sheet to define a space between the first and second face sheets having a variable thickness, and a core occupying the space.

Another aspect of the disclosure includes a panel, including: a first face sheet, a second face sheet opposed to the first face sheet, a third face sheet, a fourth face sheet opposed to the third face sheet, a first bridge node comprising a first interface that joins respective edges of the first and third face sheets, and a core material filling a space defined by at least the joined first and third face sheets.

Another aspect of the disclosure includes an additively manufactured (AM) node, including a base including a length of material having a first end and a second end, a first interface proximate to the first end, the first interface for engaging a face sheet edge of a first face sheet, a second interface proximate to the second end, the second interface for engaging a face sheet edge of a second face sheet, such that the face sheet edges of the first and second face sheets oppose one another, and a foam inlet port arranged on the base, the foam inlet port configured to enable a flow of a foam-like substance into an area defined by at least the first and second face sheets.

It will be understood that other aspects of providing interfaces using AM components will become readily apparent to those skilled in the art from the following detailed description, wherein it is shown and described only several embodiments by way of illustration. As will be realized by those skilled in the art, the subject matter presented herein is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of interfaces between parts of a transport structure will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of interfaces between parts of a transport structure and is not intended to represent the only embodiments in which the invention may be practiced. The terms "example" and "exemplary" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

The use of 3-D printing in the context of transport structures provides significant flexibility for enabling manufacturers of mechanical structures and mechanized assemblies to manufacture parts with complex geometries. For example, 3-D printing techniques provide manufacturers with the flexibility to design and build parts having intricate internal lattice structures and/or feature-rich geometric profiles that are not practicable or possible to manufacture via traditional manufacturing processes.

Figure 1A:
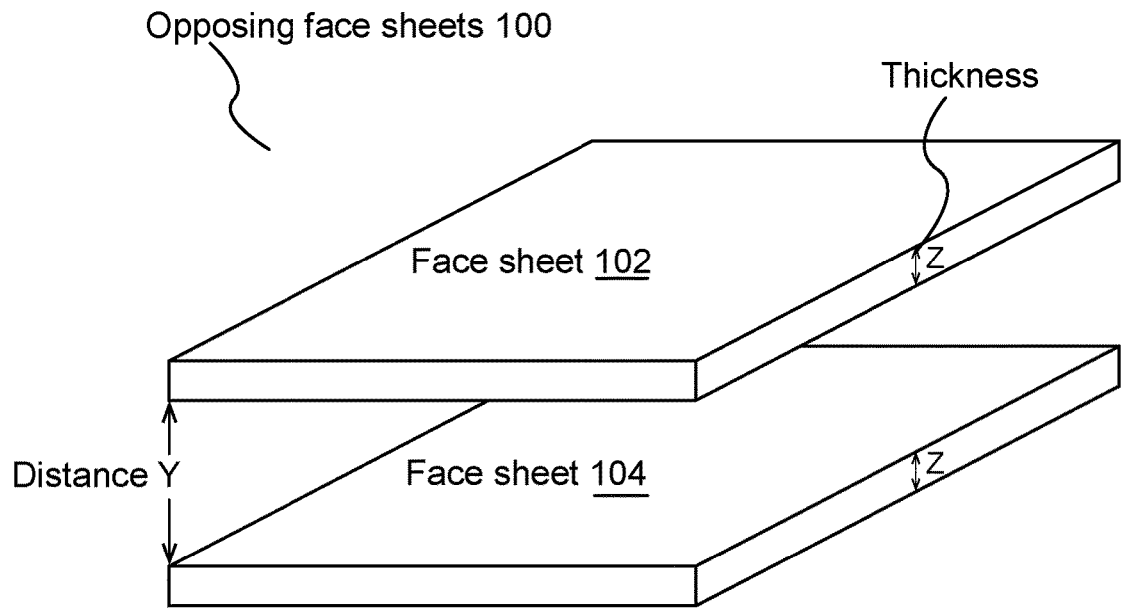
FIG. 1A is a perspective view of an opposing pair of face sheets.
Figure 1B:
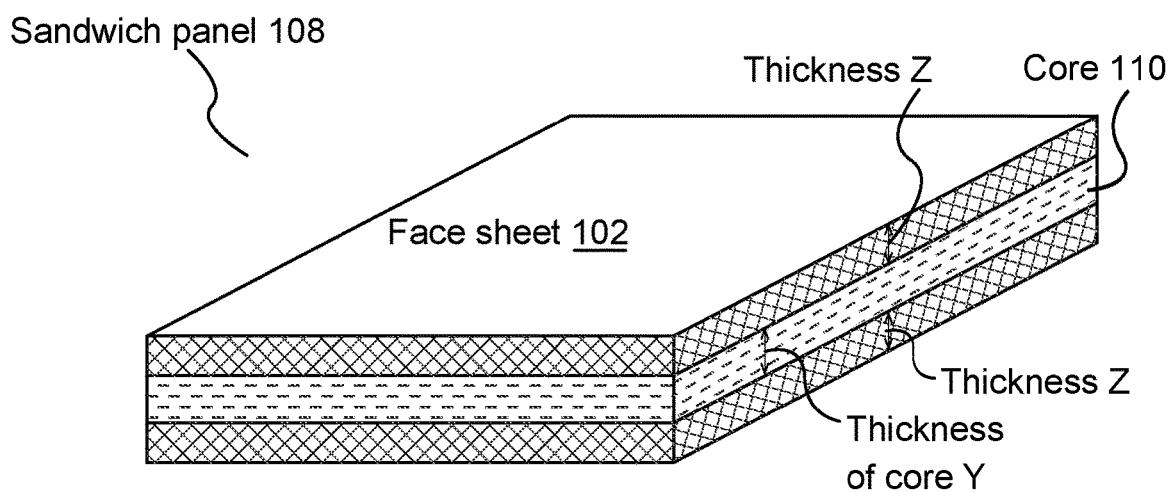
FIG. 1B is a perspective view of a sandwich panel.

Aspects of the present disclosure are directed to techniques for fabricating custom panels in transport structures. Conventional panels are typically formed with top and bottom "skins" or "face sheets". The face sheets may be composed of a metal such as aluminum or titanium, an alloy, a plastic, or a composite such as carbon fiber or fiberglass. Face sheets can be formed using a conventional technique such as resin transfer molding (RTM), for example, or they can be milled or additively manufactured. FIG. 1A is a perspective view 100 of a pair of opposing face sheets 102 and 104. Each face sheet 102 and 104 may be additively manufactured, or traditionally formed via casting or machining techniques. Each face sheet has dimensions characterized by a thickness Z and a uniform distance Y therebetween in the example shown. A low-density core is typically adhered to the inner surfaces of the face sheets using an adhesive. FIG. 1B is a perspective view of a corresponding sandwich panel 108. Core 110 may be made a solid structure or, for reducing weight while maintaining structural integrity, core 110 may be composed of a lattice or honeycomb structure or other custom structure. Core 110 may be manufactured through traditional subtractive manufacturing techniques or it may be additively manufactured. Edges of core 110 may be trimmed if necessary to maintain a position flush with face sheets 102 and 104.

As is shown in FIG. 1B, the thickness Y of the core 110 may be constant across the plane of the sandwich panel 108. As discussed above, components such as load-bearing panels often require more complex interfaces and connections than are currently machined using conventional methods. These methods can be costly and time-consuming, given that traditional manufacturing techniques typically are not optimal for producing geometrically complex components and are seldom capable of producing a variety of different geometric configurations using the same tooling. Moreover, because many conventional transport structures rely on body parts and outer shells that must be engineered to provide resistance to significant structural loads, added structures may be needed such as sophisticated brackets, clamps, and screws to provide a sufficiently strong interface between these body panels and other components within the transport structure to provide long term structural durability.

In an aspect of the disclosure, custom panels are formed to incorporate a core having a thickness that is variable across the plane of the face sheets. In an exemplary embodiment, varying the thickness of the core 110 can be accomplished by first, utilizing face sheets having varying profiles relative to one another, and second, injecting foam, a low-density core material, through additively manufactured nodes to expand and fill the space between the top and bottom face sheets. The foam or foam-like substances can be designed to cure and solidify to realize the geometrically diverse custom formed panel.

Figure 2A:
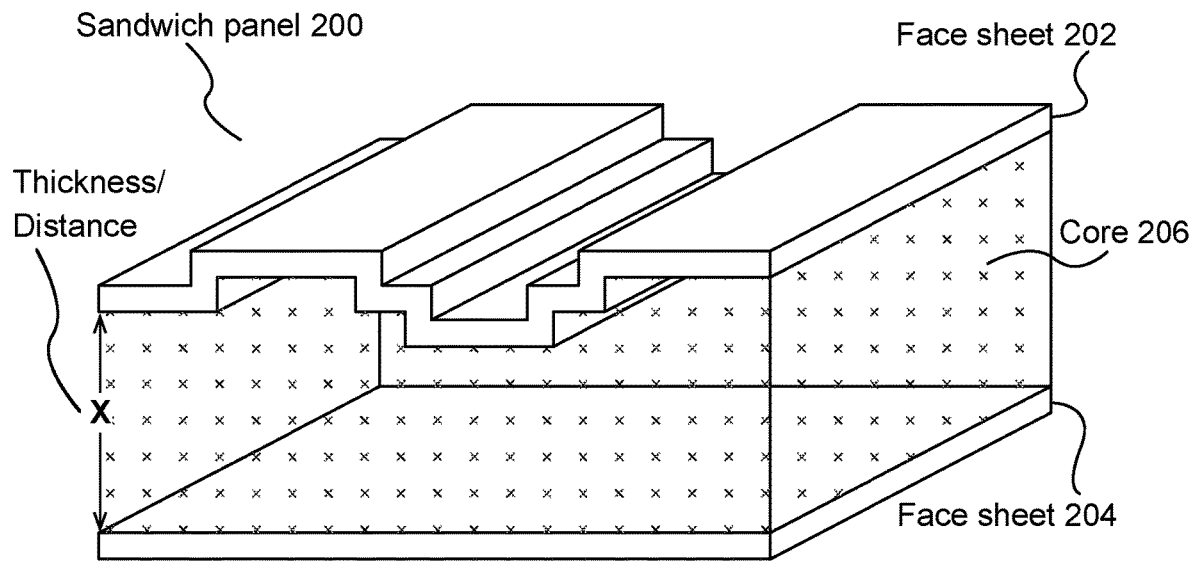
FIGS. 2A-C are perspective views of different custom sandwich panels having a variable thickness between respective face sheets according to an aspect of the disclosure.
Figure 2B:
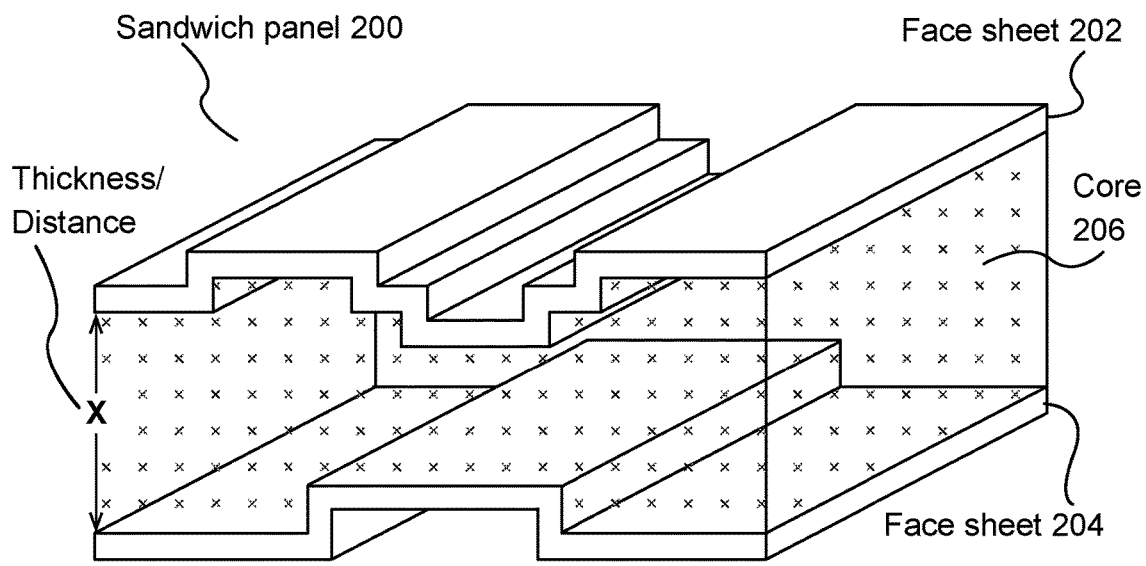
Figure 2C:
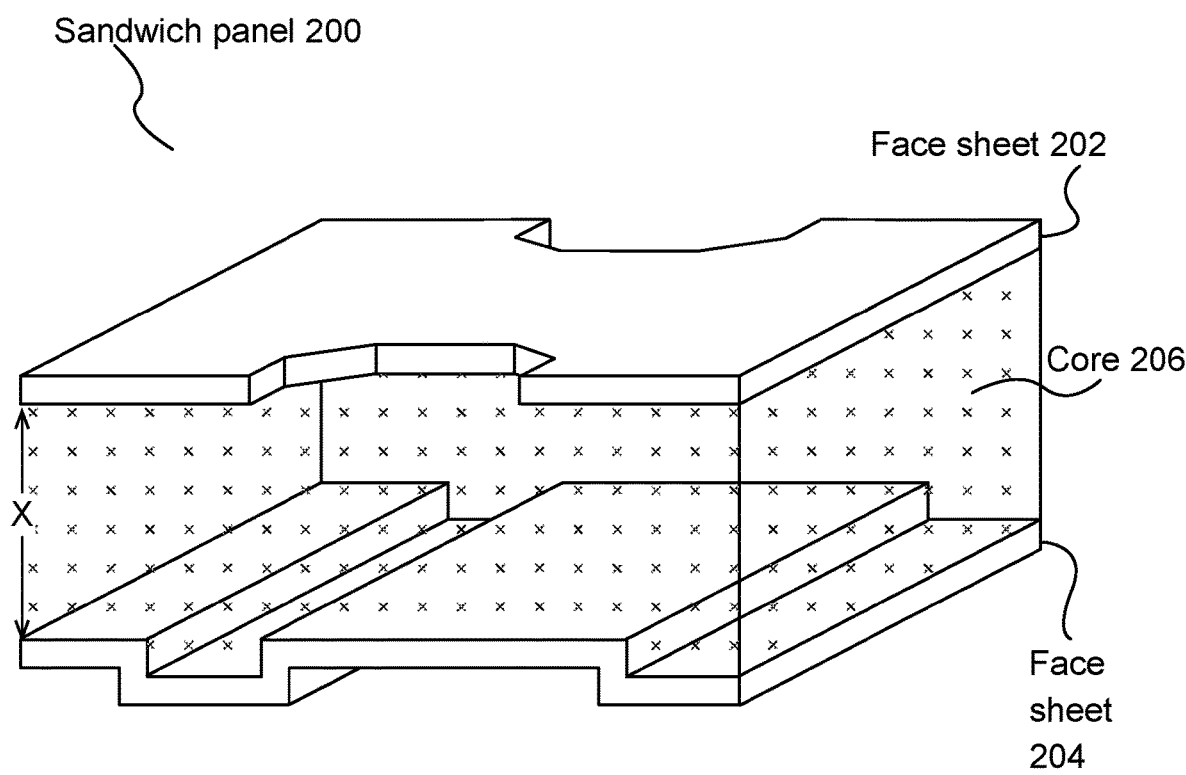

FIGS. 2A-C are perspective views of different custom sandwich panels having a variable thickness between respective face sheets. Referring first to FIG. 2A, sandwich panel 200 has a flat face sheet 204 at the bottom and a geometrically sophisticated face sheet 202 at the top, such that the distance or thickness X between the face sheets is variable across their inner surfaces where the core 206 is present. As depicted in FIG. 2A, the profiles of the top and bottom face sheets are different. As a result, when the face sheets are positioned opposite one another and maintained generally parallel to each other, the distance between them (X in FIG. 2A) varies at different points of measurement along a plane parallel to face sheet 204. For clarity, the profile of the bottom face sheet 204 has been depicted to be a simple planar sheet. However, the bottom face sheet can have any profile, depending on design requirements or other criteria. In other exemplary embodiments, the face sheets may both be contoured uniquely. FIG. 2B shows sandwich panel with a varying distance X between inner surfaces of the face sheet, but with lower face sheet 204 having an uneven profile as well as upper face sheet 202. FIG. 2C shows the sandwich panel wherein the vertical geometrical features are principally included in the lower face sheet 204. The upper face 202 may be flat but may include horizontal indentations to expose the underlying core 206 for accomplishing an application-specific objective. For example, in an embodiment, the core 206 may be extended upward through one or both of the indentations and coupled to a fixture, a connector, or another desired feature. Techniques for assembling the core in this manner are detailed further below.

Fabricating the face sheets. In an exemplary embodiment, the face sheets can be additively manufactured (3-D printed). Alternatively, as noted above, the face sheets can be fabricated using resin transfer molding (RTM). RTM is an effective technique for molding components with large surface areas, complex shapes and smooth finishes. Other techniques for manufacturing the face sheets are possible. The face sheets can also be vacuum bagged using carbon fiber reinforced polymer (CFRP) or glass fiber reinforced polymer (GFRP), etc., as the composite material, for example. The face sheets can also be manufactured via compression molding, Sheet Molding Compound (SMC), Vacuum assisted resin transfer molding (VARTM), injection molding, and the like.

In an aspect of the disclosure, the thickness between the face sheets is not constant across their areas. As described in more detail below, an additively manufactured node may be used to fixture the panel by securing the two face sheets with respect to each other. In other embodiments, locating features may be used to achieve the precise location of the two sheets during assembly. Adjacent components having dissimilar materials may also be isolated from one another to prevent galvanic corrosion or to address other problems caused by direct contact of the materials. An appropriate isolating material may be provided between the two materials where physical contact is to be avoided.

Preparing the face sheets for assembly into a panel. In an exemplary embodiment, an additively manufactured node may be used to form the panel. The node may provide a number of functions including (i) orienting the face sheets in a precise manner relative to one another, (ii) providing locating and isolating features, where desired, to facilitate assembly and prevent corrosion of future parts, (iii) optionally providing adhesive inlet, vacuum, and/or sealant features for forming the bond between the node and the panel in circumstances where, for example, the node and panel are intended for use as an integrated unit for assembly within a vehicle or other transport structure, and (iv) forming the sandwich panel by facilitating injection of a foam-like substance through a channel in the node, such that the foam will occupy the space between the nodes and solidify in a curing stage to form the core.

A node is a structural unit in a vehicle or other transport structure that can serve as a joint member or other structural interface for interconnecting tubes, panels, extrusions, and other portions of the vehicle. A node may include multiple interfaces such that multiple structures having different interfaces (e.g., tongues, grooves, etc.) can be interconnected and integrated together. Beyond or apart from its role as a joint member or interconnect unit, a node may perform different specialized functions. For example, the node may be configured to deliver fluid, adhesive, sealant, vacuum, and other materials to specific regions of an adjacent or connected structure in order to form a strong bond or to realize another functional relationship with the adjacent or connected structure. The node may also be used to route various structures such as electrical cabling. Nodes may be designed with different geometries and physical characteristics, e.g., to provide support as part of a load bearing structure, to enable a portion of a vehicle to include a "crumple zone" for absorbing energy in an impact event, or to provide non-load bearing aesthetic features. A significant benefit of using nodes in a transport structure is that the transport structure can be modular, meaning that different portions of the vehicle can be independently assembled and can be readily exchanged or replaced using standard interfaces without having to exchange or replace other portions of the vehicle that do not need changing. This is in contrast to conventional approaches, where damage to a small portion of a vehicle often requires that a number of panels be removed and replaced, however unrelated they are to the damaged structure. Also, using nodes, portions of the vehicle can be upgraded or modified without affecting other modules in the vehicle.

As noted above, the node may be additively manufactured or otherwise constructed to position two opposing face sheets. The node may be a base section 350 of material having, among other possible geometrical features, a lengthwise dimension "I" (FIG. 3A) which includes interfaces 312*a-b* that engage with edges of the opposing panel to hold them in a generally parallel or opposing position relative to each other, such as shown in the node 310 of FIG. 3A. As detailed below, the node may include features such as inlet and outlet adhesive ports to provide adhesive and vacuum to and from the channel. The node may also include features to accept sealants, O-rings and isolators. The node may include adhesive channels. As an example, in some embodiments a strong adhesive bond may be desired between the face sheets and core. The node can provide an interface to draw a vacuum and inject the adhesive. Thus, for example, the node may include extension portions that protrude from the base and that allow for an even injection of sealant and adhesive across the structure.

In addition, the node 310 may include inlet ports for enabling a manufacturer to form the core between the panels by injecting a foam-like substance into the space defined by the face sheets 302, 304. The foam-like substance may enter the space between the face sheets and thereafter solidify to form the core 306. In an embodiment, the manufacturer may cut away, manually or using an automated mill, the excess portions of substances extending outside the border between the face sheets. In another embodiment, the manufacturer may remove any excess foam prior to it solidifying, such as by using a brush or other light tool to remove the excess foam and straighten the edges. In an embodiment, the node-face sheets structure may be housed in a compartment or chamber that has walls designed to contain the foam. In another embodiment, the node itself may be constructed with walls or a chamber that contains the foam in its desired area between the face sheets 302, 304.

Figure 3A:
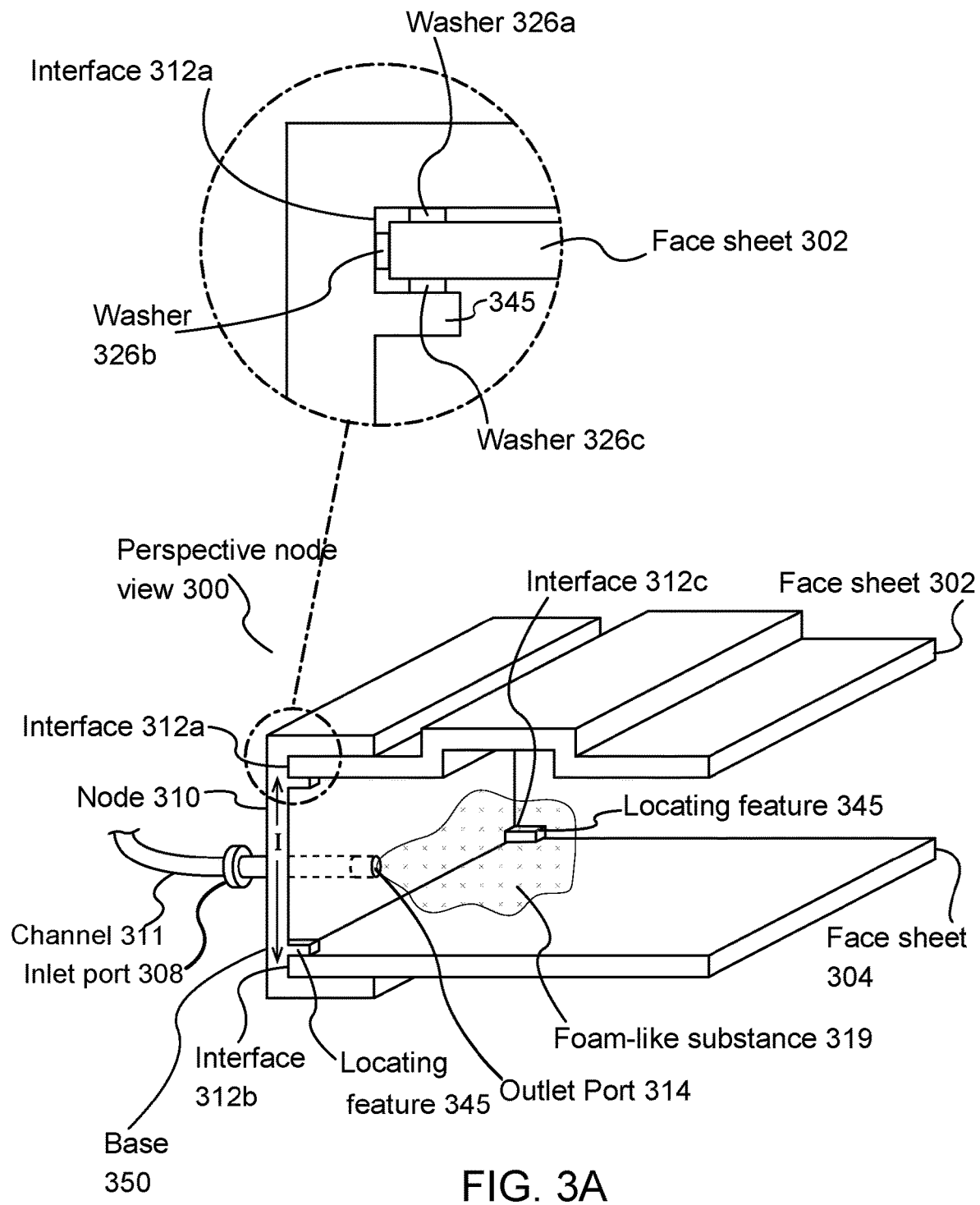
FIG. 3A is a perspective view of an additively manufactured node being used to assemble a sandwich panel according to another aspect of the disclosure.

Referring in more detail to FIG. 3A, a perspective view 300 of an additively manufactured node 310 is shown securing face sheets 302 and 304. In an exemplary embodiment, the node 310 may be additively manufactured using a powder bed fusion (PBF)—based 3-D printer such as, for example, selective laser sintering (SLS). However, any 3-D printing technique may generally be employed. The additively manufactured node 310 may include a base section 350 that may extend lengthwise vertically as shown by the arrow labeled I. Proximate each end of the lengthwise section I are interfaces 312*a* and 312*b* for the face sheets 302 and 304, or other types of female interconnect features (such as grooves, slots or apertures) designed to enable corresponding male interconnect features (such as tabs, protrusion, or here, the edges of respective face sheets 302 and 304) to fit securely in place. In other embodiments, the interfaces 312*a* and 312*b* may use another type of interconnect. For example, the interfaces may alternatively include protrusions designed to fit into a corresponding groove etched into face sheets 302 and 304. The interfaces may, in another embodiment, include clamps for securing the face sheets 302 and 304 with a force.

Thus, one function of node 310 is to hold the face sheets in place so that they are precisely oriented at the correct distance from each other in the correct position. Additively manufacturing the node enables the designer to use a node of any arbitrary shape for securing opposing face sheets of specific widths and for varying the base section such that the edges of the panels can be positioned at any desired distance closely proportional in this embodiment to I.

Referring still to FIG. 3A, in an exemplary embodiment, locating features 345 shown near each interface 312a-d may be used to orient the two face sheets properly with respect to each other during the manufacturing process. The locating features may include protrusions that in part define interfaces 312a, 312b, 312c, and 312d, or they may include other types of locating features 345 additively manufactured into the node. In an exemplary embodiment, the locating features are co-printed with the node and define four female interconnect features, one at each interface 312a-d. In cases where contact between dissimilar materials (node and face sheet) is to be avoided to prevent galvanic corrosion or for other reasons, the locating features may include an isolating material. FIG. 3A shows a blow-up of interface area 312a which shows that the face sheet 302 has been separated from node 310 by the use of isolating structures such as nylon washers 326a-c, a side view of which is shown in the blow-up and expanded for clarity. To accommodate the nylon washers 326a-c in an exemplary embodiment, the internal groove of interface 312a may be printed with further recesses (not shown) designed to receive the nylon washers. In a post-processing step, an adhesive may be injected into the recesses, e.g., using channels co-printed into the node that connect an inlet port to one or more apertures in the recesses. The adhesive may be injected via an automated machine or manually, and the washers 326a-c may then be inserted into the recesses to bond onto the inner portions of the recesses where they protrude outward. In other embodiments, structures other than washers may be used, and in still other embodiments, the isolating structures may be co-printed with the node 310 and pre-affixed to the node 310. Locating features 345 in some embodiments may also perform the isolation function. Thus, the face sheet 302 can advantageously maintain separation from node 310 where such separation is necessary. A similar separation technique (not shown) can be used on the interface 312b for isolating face sheet 304 from node 310.

The node may optionally be constructed as a part of the transport structure. In this case, node 310 and the connected face sheets 302, 304 may ultimately form a node-to-panel connection for assembly in a vehicle or other transport structure. As noted above, in various exemplary embodiments, the node may incorporate additional features such as adhesive injection and outlet ports, adhesive channels, transfer ports, and sealant features. Many of these features are illustrated in detail in Applicant's previous patent application Ser. No. 15/853,301 and filed Dec. 22, 2017 by the present Assignee entitled "Methods and Apparatus for Forming Node to Panel Joints", the contents of which are hereby incorporated by reference as if fully set forth herein. That prior application filed Dec. 22, 2017 involved a panel that was formed prior to the assembly with the node. In the present disclosure, the features of the node are being exploited to form the panel. In either case, the node-panel structure may integrated together and assembled into the transport structure as a full node-panel connection. To this end, node 310 may include other interfaces, functional features or interconnect features for interfacing with other structures. Certain of these features are omitted for clarity and to avoid unduly obscuring the concepts of the disclosure.

Preparing the Panel Core.

In another aspect of the disclosure, the interior core 206 (FIGS. 2A-C) is prepared by means of a foam inlet port 308/outlet port 314 additively manufactured with node 310 (FIG. 3A). The foam inlet port 308 may include a channel 311 to enable the inlet of a foam-like substance 319 that will become the core material. Foam may be injected into the inlet port 308. Upon injection, the foam 319 may travel through the foam channel (e.g., a hole through node 310) and flow out of the foam outlet port 314. While one foam outlet port 308 has been depicted for simplicity in FIG. 3A, the node can have any number of foam ports distributed across a region of the face sheets. For example, for a longer or larger panel, it may be desirable to include a plurality or array of evenly spaced foam inlet ports for effecting an even application of the foam.

Figure 3B:
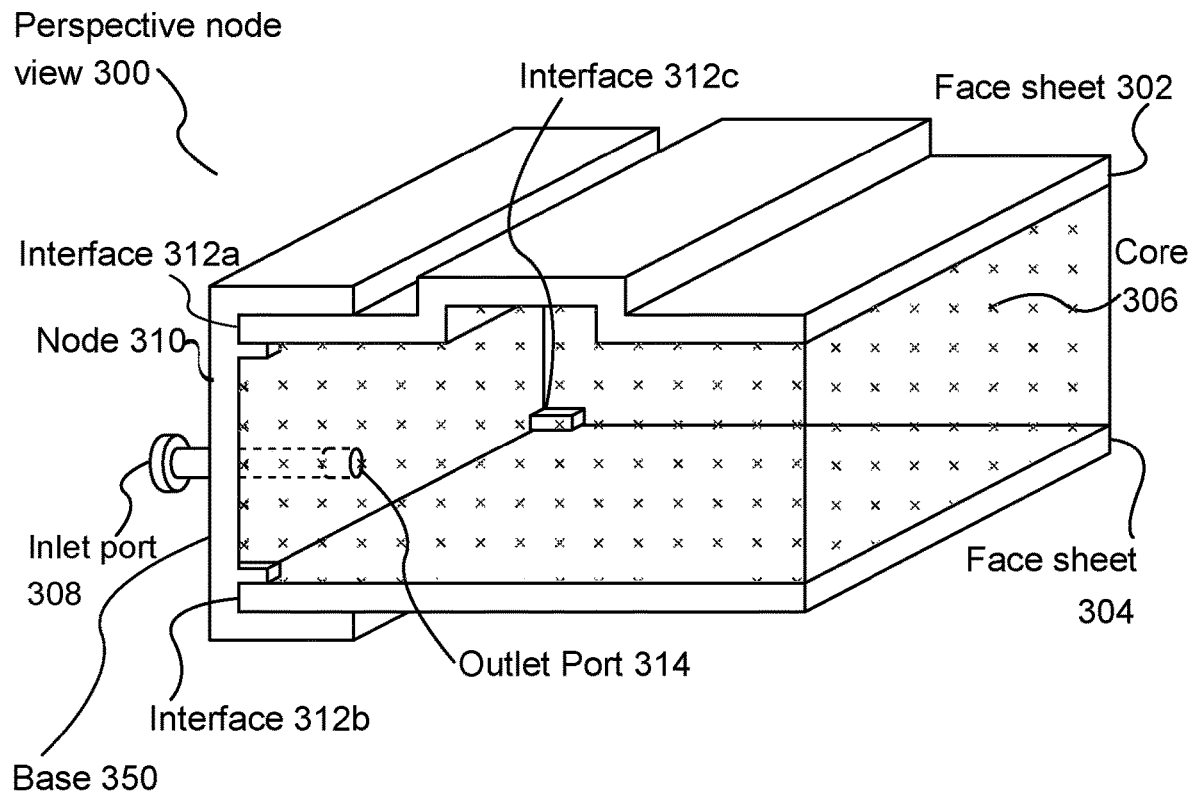
FIG. 3B is a perspective view of the additively manufactured node coupled to an assembled sandwich panel according to another aspect of the disclosure.

Referring to FIG. 3A, the foam 319 may expand to occupy the void. The foam may then solidify into a solid interior core 306 that was pre-designed to incorporate the necessary density properties and other characteristics. This may result in the formation of a custom formed panel with the core 306 shown in FIG. 3B. Containment of the foam 319 may be controlled in different ways. The foam may be contained before or after it solidifies or cures into a solid core substance. In one post-processing step, the excess foam that travelled outside the volume defined by the face sheets 302 and 304 may simply be cut or shaved off by a tool. In an alternative exemplary embodiment, the assembly 300 may further include walls bordering the face sheets to prevent further spread of the foam 319. The assembly 300 may also be placed in an appropriately sized chamber to contain the foam 319 to its proper position between the face sheets. The chamber may be pressurized to control the ejection and spread of the foam 319.

Figure 3C:
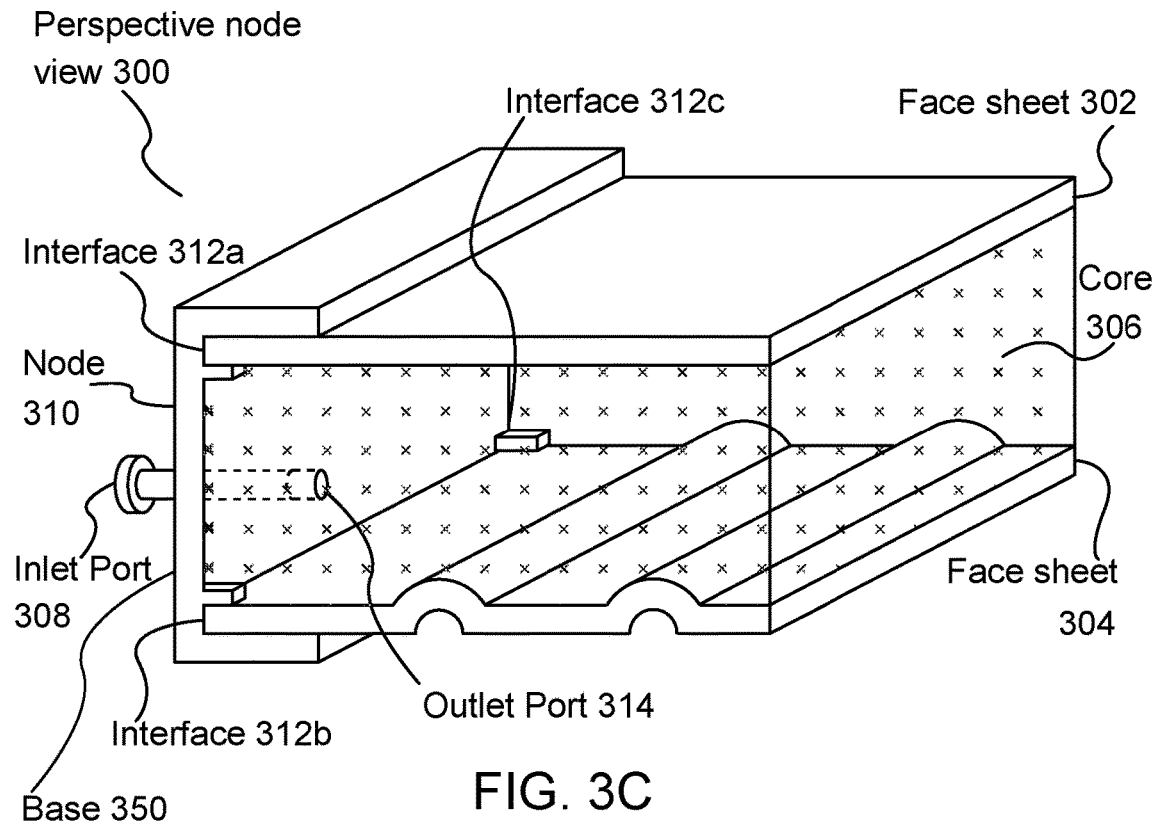
FIG. 3C is a perspective view of the additively manufactured node coupled to another example of an assembled sandwich panel according to another aspect of the disclosure.

In an exemplary embodiment, the inner surfaces of the face sheet may be coated with an adhesive, whether manually or by means of a robot or automated machine, to ensure adherence of the foam to the face sheets. The adhesive injection process may commence prior to, during, or after completion of the foam injection process. The resulting sandwich panel, whether separated from the node 310 or used as connected to the node 310, may thereafter be assembled with other components, or into the transport structure at another station. FIG. 3C represents another perspective view of the node/panel combination. In this embodiment, lower face sheet 304 includes a pair of curvatures that extend upward. Thus, the final assembled panel, or node panel combination 300, need not be restricted to sharp gradients or step variations in the geometrical profile of one or both face sheets 302 and 304. Any shape, including gradual and curved orientations, may be used to realize the face sheet 302.

Additive manufacturing advantageously provides the platform for the creation of a single component with the complex adhesive and foam transport features. Expensive casting equipment and precision machining techniques are no longer required to create a complex sandwich panel with virtually any geometry.

Although node 310 is shown for simplicity to only include a single lengthwise base section 350 having two interfaces 312a-b, in other exemplary embodiments, the node may include multiple interfaces to secure additional face sheets, for example in a case where it is desirable to include additional plies of face sheets in the interior. Node 310b may in alternative embodiments include interfaces facing to the left relative to node 310 of FIG. 3A, so that a single node can be used to position and assemble two or more panels. In an embodiment, the base 350 of node 310 can include a long value of I, with multiple interfaces on one or both sides of the base 350 to position and secure multiple nodes. The resulting array of node and panels can optionally be assembled as a unitary segment into a transport structure.

While base 350 is illustrated essentially as a having an elongated rectangular shape, the node 310 is not limited to this configuration and base 350 can include different shapes and orientations in different embodiments.

The core material, when solidified, can provide the panel with the necessary structural integrity, among other desired properties. In an exemplary application, expanding Polyurethane (PU) foam may be used for the foam injection process. However, any expandable foam that can be injected can be used for this application. In some cases, urethane foam can be injected. In addition, multiple materials may be blended and injected, or they may be injected without blending. In an embodiment, the injection process may include injecting a two-part (or n-part, where n>2) foam system as liquids in precise quantities. The resulting foam may be formed during the reaction of the two-part (or n-part) systems and may expand to occupy the space between the face sheets.

Figure 3D:
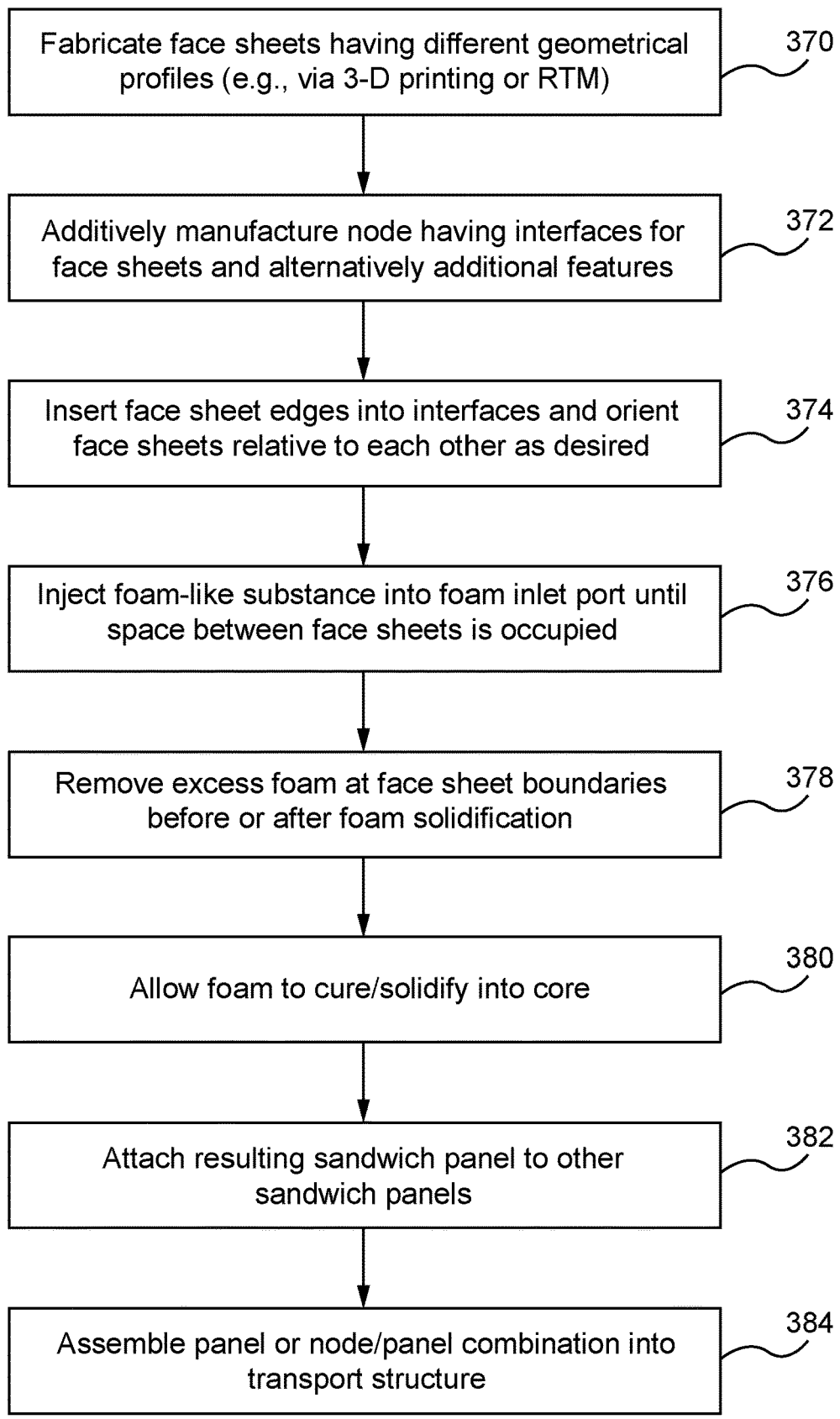
FIG. 3D is a flow diagram illustrating an exemplary process for assembling a sandwich panel using face sheets with different geometrical profiles and assembling an integrated node-sandwich panel into a transport structure.

FIG. 3D is a flow diagram illustrating an exemplary process for assembling a sandwich panel using face sheets with different geometrical profiles and assembling an integrated node-sandwich panel into a transport structure. At 370, face sheets having different geometrical profiles are fabricated, whether through additive manufacturing or conventional means such as RTM, etc. The design profile of the face sheets may be unique to a specific application, so that the fabricated panel may include unique geometrical properties. For example, the vertical distance between the face sheets in the assembled panel may vary at different locations. At 372, a node is additively manufactured to include interfaces for positioning and securing the opposing face sheets. The node may also include one or more inlets for applying a foam material to produce the core. The node optionally may include one or more of the features described in detail above, such as adhesive or vacuum injection ports. The node may also be designed with its own features relevant to the role it may play when and if it is assembled with the attached panels into a transport structure. For example, the node may include valves, extrusions, interfaces or other features for use as a part of a vehicle. Thus, in addition to its interface with the custom panels, the node may have separate interfaces to lock it into the transport structure and to perform additional features whether or not related specifically to the custom panels.

At 374, the face sheet edges are inserted into the interfaces on the node, either manually or by an automated machine or robot using a suitable effector for manipulating face sheets with respect to the node. The face sheets are precisely oriented with respect to each other. Locating features such as structures 345 in FIG. 3A, above, may be used to facilitate the orientation. At 376, assembly of the core begins as a foam is injected into the one or more foam inlet ports until the space between the opposing face sheets is occupied with the foam. At 378, excess foam may be removed at the face sheet boundaries. This step 378 may be performed before or after solidification of the foam or it may be performed by a pre-existing border structure or chamber in which the sandwich panel is being assembled.

At step 380, the foam is allowed to cure and solidify into what becomes the interior core material, thus realizing the sandwich panel. The core can be designed to have different properties based on the selected composition of the foam. In some embodiments, the solidified core is adhered to the respective inner faces of the face sheets. As discussed above, this adherence may be accomplished using adhesives. In an embodiment, the foam is self-configured to adhere to the surface of the face sheet as it solidifies. In other exemplary embodiments, adherence is accomplished by applying heat to the core/face sheet interfaces or by fusing or melting the core material and face sheets together with lasers, electron beams, electric arcs, or other energy sources.

At step 382, the constructed sandwich panel is attached, where desired, edgewise to other sandwich panels, whether conventionally using bonding techniques or alternatively using bridge nodes (discussed below). It will be appreciated that, in addition to the above, other steps may be used to fortify the bond between the node itself and the newly-created panel, such as by adding adhesive, sealant, and vacuum, and using O-rings or other structures. Thereafter, at 384, the resulting node/sandwich panel integrated combination can be assembled into the vehicle or other transport structure. In alternative embodiments, the sandwich panel can be attached to a structure other than a panel, such as another node, an extrusion, and the like.

Bridge Nodes.

In some exemplary embodiments, it is desirable to connect a chain of sandwich panels into one long panel. In some embodiments, the chain may be connected by bonding or welding. In some embodiments, the top and bottom face sheets are instead joined together first (prior to completing the sandwich panel) using bridge nodes. Bridge nodes may be used to "bridge" the elements in the face sheet chain by forming adhesive bonds between the surfaces of the face sheets and the bridge nodes. In an embodiment, depending on the mechanical requirements, the bridge node may either form a single shear, double shear, or both, with the face sheets.

Figure 4A:
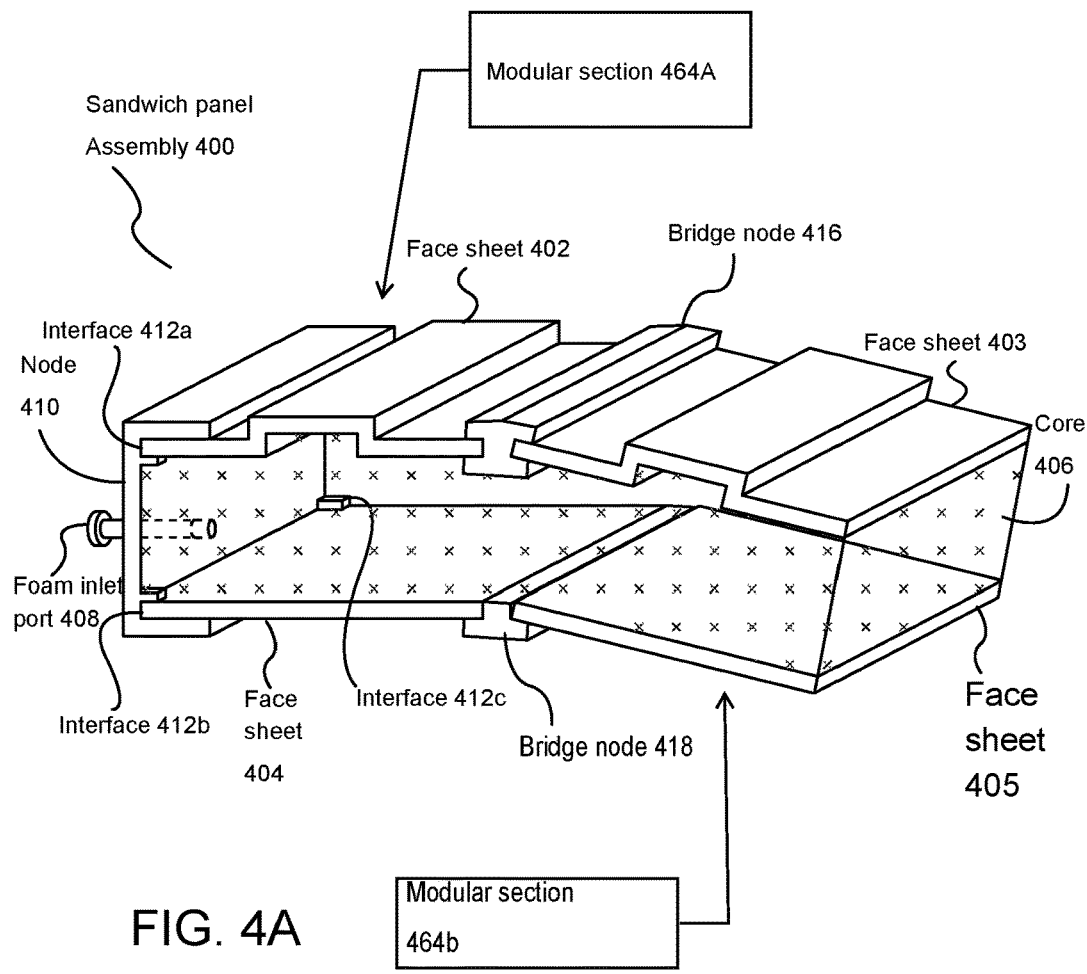
FIGS. 4A and 4B are perspective and side views, respectively, of an additively manufactured node coupled to a sandwich panel assembly using bridge nodes to secure the face sheets edgewise.

FIG. 4A is a perspective view of an additively manufactured node coupled to a sandwich panel assembly 400 using bridge nodes to secure the face sheets edgewise. Node 410 includes foam inlet port 408. Node 410 includes groove-based interfaces 412a and 412b. Groove interface 412c is also partially visible (i.e., the isolator is shown). In some embodiments, such as here, interfaces 412a and 412b are continuous grooves that extend into the drawing to the other side of the node. In such embodiments, a separate interface groove on the opposite side of the node (such as at interface 412c) may not be necessary. Thus, the lower member of interfaces 412b and 412c may be parts of the same structure. In some embodiments, the grooves of interfaces 412a-c include other features, such as a reinforcing member co-printed with the node (not shown), attached to the base and extending between the isolators above the face sheet to strengthen the connection to the face sheet. Other connection means may be possible.

FIG. 4A includes opposing face sheets 402 and 404 as shown in prior embodiments. Node 402 is coupled edgewise to another face sheet 403 via bridge node 416. Bridge node 416 may be additively manufactured to achieve a desired shape. Bridge node 416 may be constructed using any suitable material, and may, but need not, be constructed from the same material as node 416. Bridge node 416 is a double shear node, meaning that it is reinforced in a generally "I" shape with connecting members on both sides of the face sheets 402 and 403, and therefore it is designed to withstand shear forces on both sides. In addition, the grooves on the double shear node help ensure a solid and snug fitting of the face sheet edge, which receives support on both sides. The double shear node can add mass, and therefore the single shear node may be alternatively used in cases where the anticipated loads and forces do not mandate the double shear variety.

Bridge node 416 may couple the face sheets 402 and 403 together in various ways. In the embodiment shown, the generally "I" shape includes grooves on each side in which the edges of respective face sheets 402 and 403 are inserted. The face sheet edges may be bonded to the bridge node 416 via an adhesive. Bridge node 416 may optionally include additional features as necessary such as isolators and ports and channels for adhesive, vacuum, sealant, and the like. In the present embodiment, bridge node 416 is constructed to be streamlined and simple.

The bridge node 416 may be constructed to angle the adjoining face sheets 402 and 403. In this manner, the sandwich panel need not be straight and instead can be positioned to include a desired angle between panels.

Face sheet 404 is coupled edgewise to face sheet 405 using bridge node 418. Bridge node 418 is a single shear node in that it only includes a supporting vertical member on one side. Bridge node 418 in the example of FIG. 4A is generally in the shape of an inverted "T". Like double shear bridge node 416, single shear bridge node 418 can be additively manufactured, or co-printed with bridge node 416 or node 410 (or the combination).

Bridge node 418 can also be shaped to meet the edges of face sheets 404 and 405 at an angle. In an embodiment, bridge node is secured to respective face sheets 404 and 405 using an adhesive, although other connection means are possible. Single-shear bridge node 418 is advantageously simpler than a double shear node and contributes less mass. Therefore, it can be used, for example, in embodiments on a side of the panel assembly 400 where less impact or force is expected. In another embodiment, bridge node 418 can be reinforced with one or both face sheets using screws or nails that penetrate the face sheet and enter the node along a side of the bridge node 418 orthogonal to the drawing. Brackets may also be used. In an embodiment, the connection functionality is integrated into the node itself to eliminate manufacturing steps while maintaining secure connections.

Construction of the panel assembly of FIG. 4A is similar to the techniques described above in FIG. 3D. For example, the node 410 and bridge nodes 416, 418 are additively manufactured. The four face sheets are constructed, e.g., using RTM. Thereupon, adhesive is injected into the grooves of interfaces 412a-b along the entire panel portion orthogonal to the drawing. Respective edges of face sheets 402 and 404 are inserted into the grooves and time is allotted for the adhesive to cure. Similarly, adhesive may be applied along the relevant members of bridge nodes 416 and 418 that correspond with the other ends of face sheets 402 and 404. Bridge nodes 416 and 418 may then be attached to the ends of face sheets 402 and 404. It will be appreciated that in other embodiments, adhesive can be applied alternative or additionally to the edges of the face sheets.

Adhesive can be applied to the remaining members of bridge nodes 416 and 418. Face sheets 403 and 405 are then attached, respectively, to bridge nodes 416 and 418. It will be appreciated that the order of attaching the various components may vary. Thus, for example, bridge nodes 416 and 418 may first be secured via an adhesive to respective face sheets 403 and 405 and then the combinations may be adhered to edges of face sheets 402 and 404. In an embodiment, the order that results in the most time-efficient assembly is used. For example, the face sheets and bridge nodes may be first assembled and attached to node 410 in a manner that minimizes the time for the adhesive in the various portions to cure. In particular, multiple bond points can be allowed to cure simultaneously to maximize efficiency of the overall assembly.

A foam source can be connected to foam inlet port 408. Foam can be injected into the space between the face sheets as described above. In an embodiment, a plurality of foam ports are used to maximize foam distribution in less time. In these embodiments, the panel assembly 400 is longer and there an increased amount of pressure may be needed to efficiently fill the space between the plurality of opposing face sheets. In an embodiment, the fill is controlled in a chamber or compartment having horizontal walls substantially flush against both sides of the assembly such that a seal is formed in the void between the face sheets. As the foam exits and fills the initial portions of the void, the pressure from the foam buildup causes the foam to migrate to the farther portions of the assembly 400. Eventually the foam will fill the entire void. In an embodiment, a vacuum is initially drawn in the compartment to ensure an even and quick distribution of the foam. In other embodiments where the distance between the face sheets is small, a compartment may not be needed and the foam can be injected until it fills the void, with the excess foam removed as described above.

Once the void is filled with foam, the foam may be cured to solidify into the interior core 406, with excess foam or core material removed at any time before, during or after the curing process. The panel assembly 400 with node 410 may then be assembled into the transport structure.

FIG. 4A shows one of several examples of the modular nature of the sections. In FIG. 4A, modular section 464A is shown, which includes the face sheets 402 and 404 as coupled to node 416. The connection uses the edges of face sheets 402 and 404 as male interconnect features (e.g., tabs) to couple to corresponding female interconnect features (e.g., slots) of nodes 416 and 418, as shown in FIG. 4A. Similarly, modular section 464b includes face sheets 403 and 405 connected to modular section 464a via nodes 416 and 418. The modular sections 464A-B may be identical, or they may differ to provide different contours or geometrical features. In this example, modular sections 464A-B provide a variable thickness within the core to include different shapes and surface contours by virtue of the non-planar shape of face sheets 402 and 403.

Figure 4B:
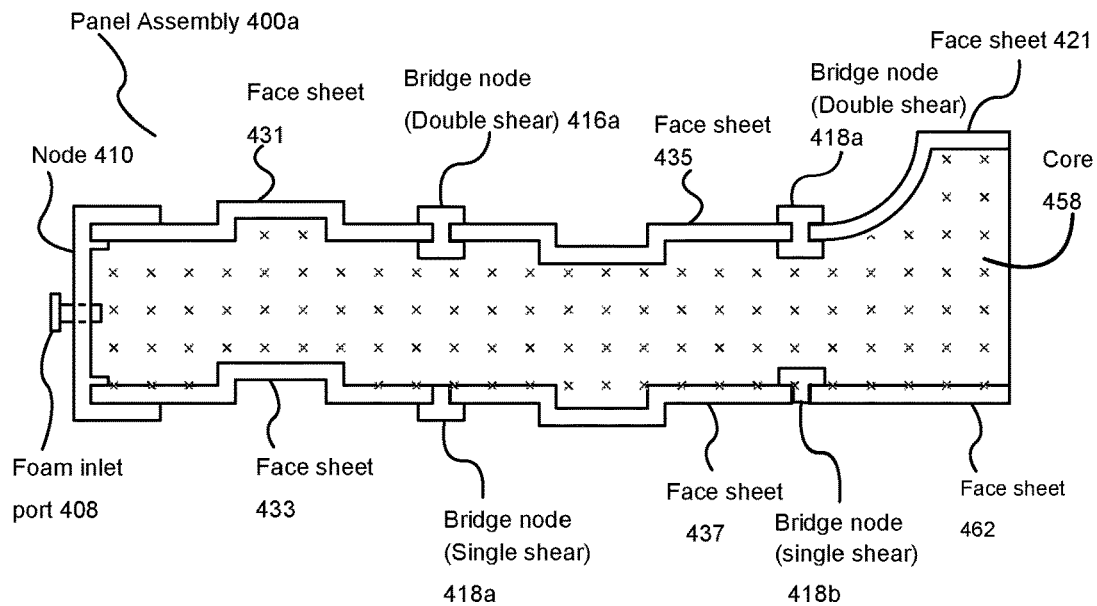

FIG. 4B illustrates a side view of a panel assembly 400a coupled to node 410 that may be constructed using methods similar to FIG. 4A. Panel assembly 400 includes face sheets 431 and 433 coupled to the base of node 410. In an embodiment, the inlet port 408 that was used to form the interior core 458 may be broken or cut off if it interferes with the placement of the resulting part in a transport structure. The assembly 400 and node 410 can then be further assembled in its intended vehicle, etc., as required.

FIG. 4B includes a double-shear bridge node 416a that couples an edge of face sheet 431 to face sheet 435. Assembly 400a further includes a double shear bridge node 416b that connects face sheet 435 to face sheet 421. Face sheet 421 is curved upward before flattening out, illustrating similar to FIG. 3C that the geometric profile of the panels need not be limited to segmented linear variations in height.

The bottom of the assembly 400 includes face sheet 433 coupled to the base of node 410 and to face sheet 437 via single shear bridge node 418a. In an exemplary embodiment, face sheet 437 is coupled to face sheet 462 via an inverted single shear bridge node 418b. The bridge node 418b is additively manufactured such that its middle member is flush with the surfaces of face sheets 437 and 462. That way, a smooth surface between face sheets 437 and 462 can be assured. In an embodiment, where manufacturing tolerances are such that the surfaces are not exactly flush or where the bridge node should not be in direct contact with the panels due to possible galvanic corrosion resulting from dissimilar materials, a sealant may be introduced into the space between the bridge node 418b along with the necessary adhesive as described above. Thus use of additively manufactured inverted bridge nodes may be beneficial in applications such as the exterior of a transport structure to minimize drag, or the surface of an aircraft to reduce parasitic and induced drag which can be detrimental to efficient flight.

FIG. 4B includes three modular sections defined respectively by opposing face sheets 431 and 433, 435 and 437, and 421 and 463. While all three modular sections provide different shapes to the core 458, the modular section defined by face sheets 421 and 462 includes a dramatically different shape. More specifically, face sheet 421 exhibits a dramatic upward curvature before leveling out on the right, such that the modular section defined by face sheets 421 and 462 have different contours than each other and other modular sections. Thus, by virtue of the shapes of the face sheets, the core 458 can have a geometry, shape or contour that is custom designed.

Figure 5:
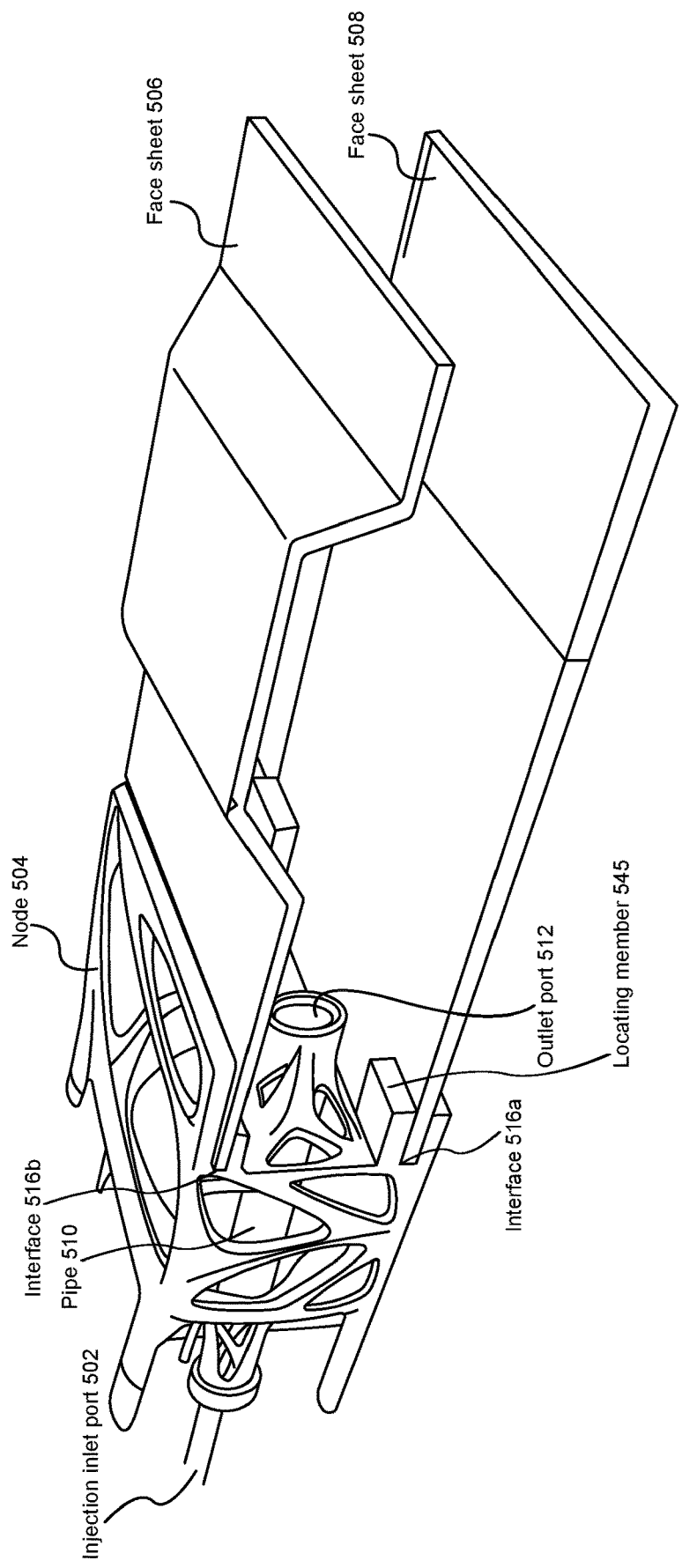
FIG. 5 is a perspective view of a pair of opposing face sheets secured via an additively manufactured node for use in a transport structure in accordance with an embodiment.

FIG. 5 is a perspective view of a pair of opposing face sheets 506 and 508 secured via an additively manufactured node for use in a transport structure in accordance with an embodiment. Injection inlet port 502 of node 504 is visible and can be used as described above for providing the core of the panel. Injection inlet port 502 can be used to provide an injection point for the foam, which travels via pipe 510 to outlet 512. Node 504, in addition to functioning as a tool to position the face sheets and create the core, can also have its own unique design that is amenable for interfacing with other structures in a vehicle. Thus the node 504 may function duly to manufacture the panel and as a functional joint member in a transport structure.

As in previous embodiments, node 504 includes interfaces 516a and 516b for connecting the face sheets 508 and 506, respectively, as well as locating members including structure 545. In some embodiments, the interior core can be manufactured from a combination of inlet foam with other structures. For example, the foam can be shaped to provide a core for the varying provides of the face sheet 506. Then a different structure, such as a lattice or honeycomb structure, can be used as part of the core to separate the flat portions of face sheets 506 and 508 to provide different physical and structural properties. This hybrid core may be useful, for example, in cases where some additional material characteristic (e.g. stiffness) is needed for the panel interior that cannot be provided by the foam.

Figure 6:
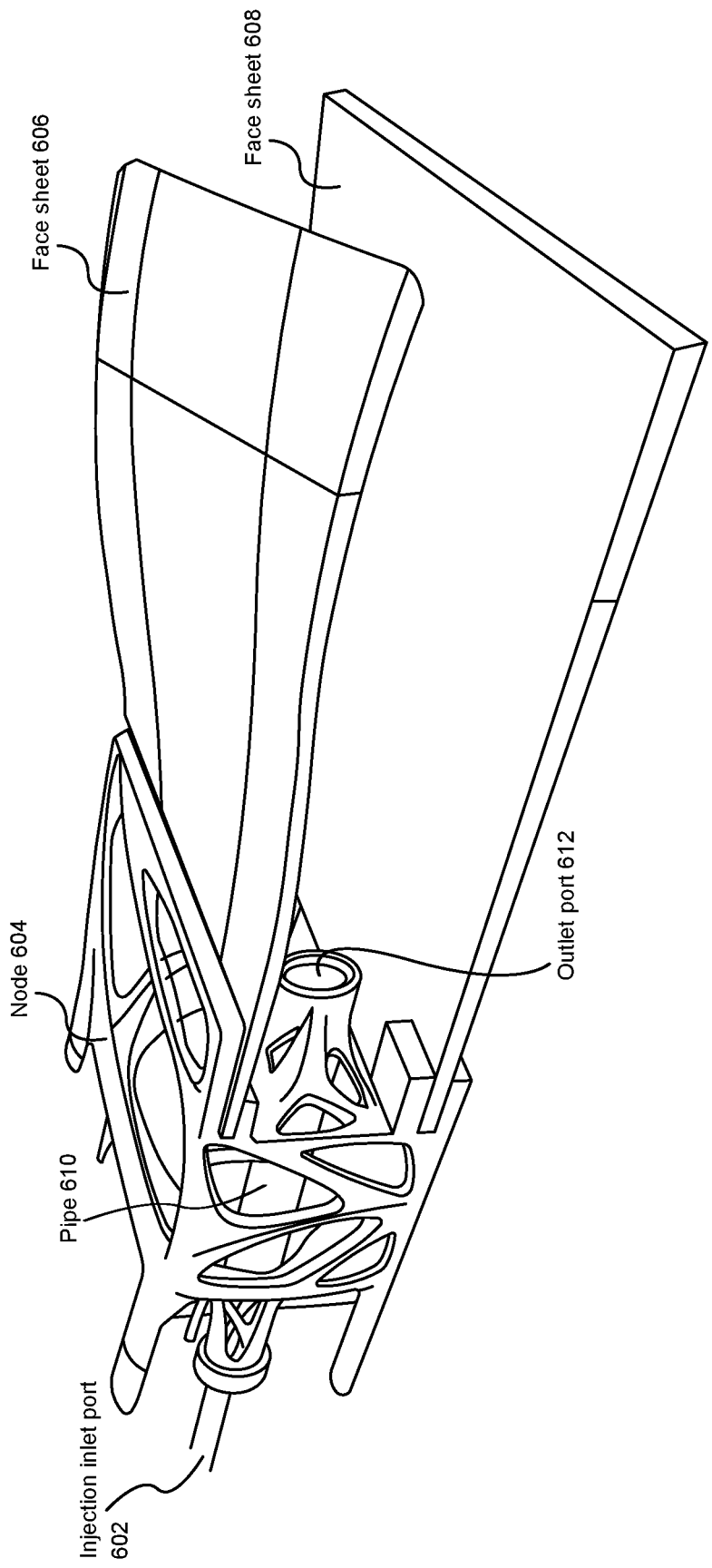
FIG. 6 is a perspective view of a pair of opposing face sheets secured via an additively manufactured node in accordance with an embodiment.

FIG. 6 is a perspective view of a pair of opposing face sheets secured via an additively manufactured node in accordance with an embodiment. The assembly of FIG. 6 is similar to FIG. 5, except that face sheet 606 has a uniquely curved contour. Injection inlet port 602 otherwise provides an inlet for the foam material via pipe 610 and outlet 612. Node 604 is coupled to face sheets 606 and 608 via interfaces as illustrated and as also described with respect to prior embodiments.

Figure 7:
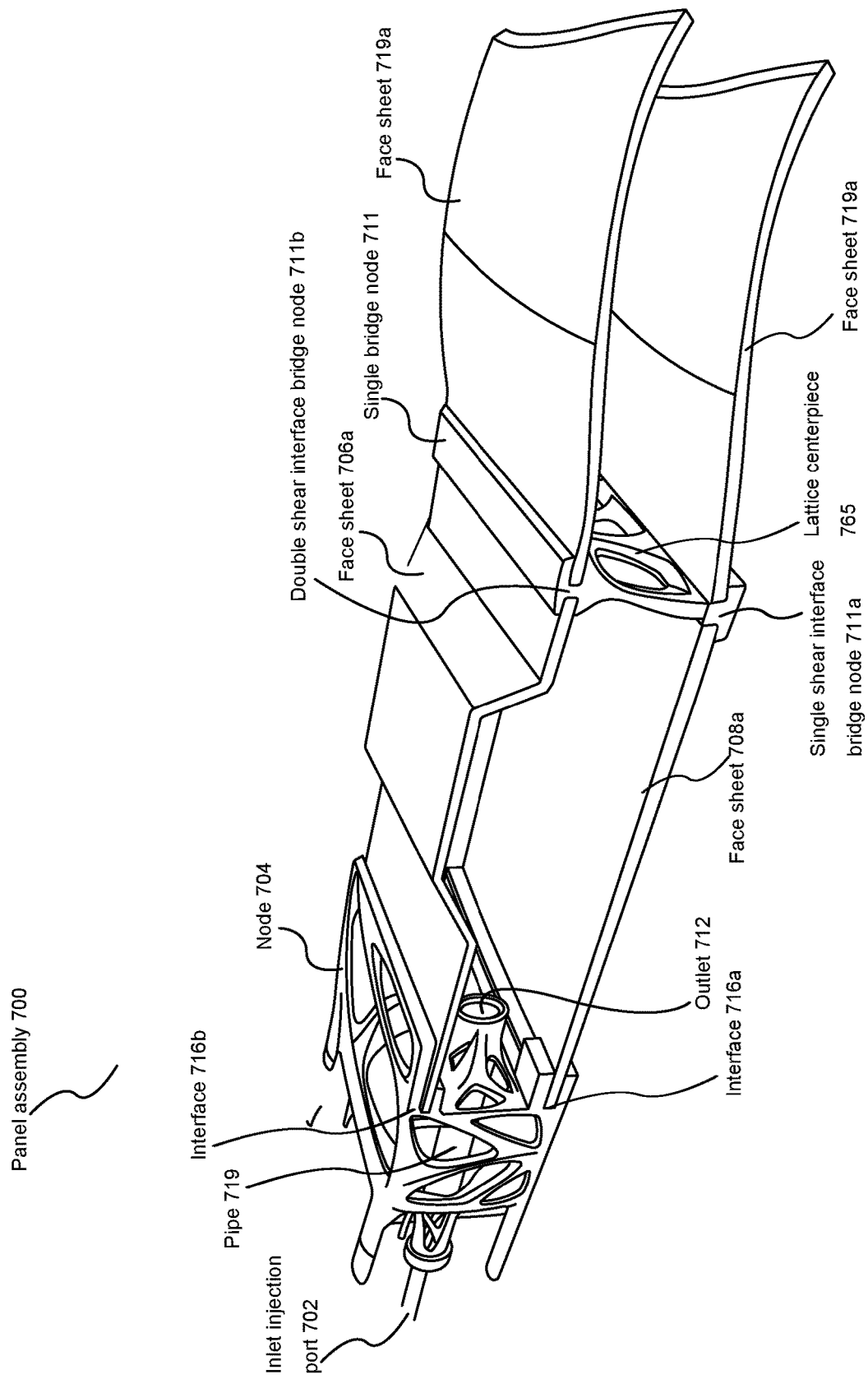
FIG. 7 is a perspective view of two pairs of opposing face sheets secured via an additively manufactured node and a single bridge node with a lattice center in accordance with an embodiment.

FIG. 7 is a perspective view of a panel assembly 700 having two pairs of opposing face sheets secured via an additively manufactured node and a single bridge node with a lattice center in accordance with an embodiment. Node 704 includes inlet injection port 702, pipe 719 and outlet 712 in a manner similar to previous embodiments. Node 704 also includes interfaces 716a and 716b for coupling with face sheets 708a and 706a, respectively. In an exemplary embodiment, face sheets 706a and 708a are respectively coupled to face sheets 719a and 719b via an additively manufactured single bridge node 711. The single bridge node 711 includes a single shear interface 711a for joining face sheets 708a and 719b and a double shear interface 711b for joining face sheets 706a and 719a. The single bridge node 711 also includes a lattice centerpiece 765 for joining the single and double shear interfaces 711a and 711b.

The single bridge node 711 accords significant benefits. For example, it can add a significant structural support member in a portion of the panel assembly 700 that is needed. Moreover, the flexibility of additive manufacturing enables the designer to shape the single bridge node 711 in any configuration suitable for the design. Here, node 711 includes lattice centerpiece 765 which has vertical members that can be made of a metallic material for providing substantial vertical support. At the same time, the designer can minimize mass of the assembly by using the lattice cutouts. In an embodiment, the node 711 is first securably affixed to the face sheets, e.g., using an appropriate adhesive at the interfaces. Once the node 704 has positioned face sheets 706a and 708a, and the node 711 has adjoined top face sheets 706a with 719a and bottom face sheets 708a with 719a, then the foam substance can be injected to produce an interior core which encases the centerpiece 611, in turn providing further support or other characteristics to the design such as a shock absorbing capability for impact events.

Additionally, the flexibility of selecting between single and double shear interfaces provides further advantages. For example, an upper portion of the assembly 700 may need structural stability in both vertical directions, namely up and down. Thus the upper face sheets are each set in a double shear interface. Conversely, the lower portion of the assembly may require only the ability to support a vertical force in a single direction, e.g., to support a load. Therefore, to reduce mass, a single shear interface may be used. The single bridge node can be customized to virtually any shape and can include a large number of different materials that may provide different characteristics to the assembly 700. In another embodiment, the single bridge node 700 can be modified to a multi-bridge node to provide more than one set of interfaces in a single matrix.

Figure 8:
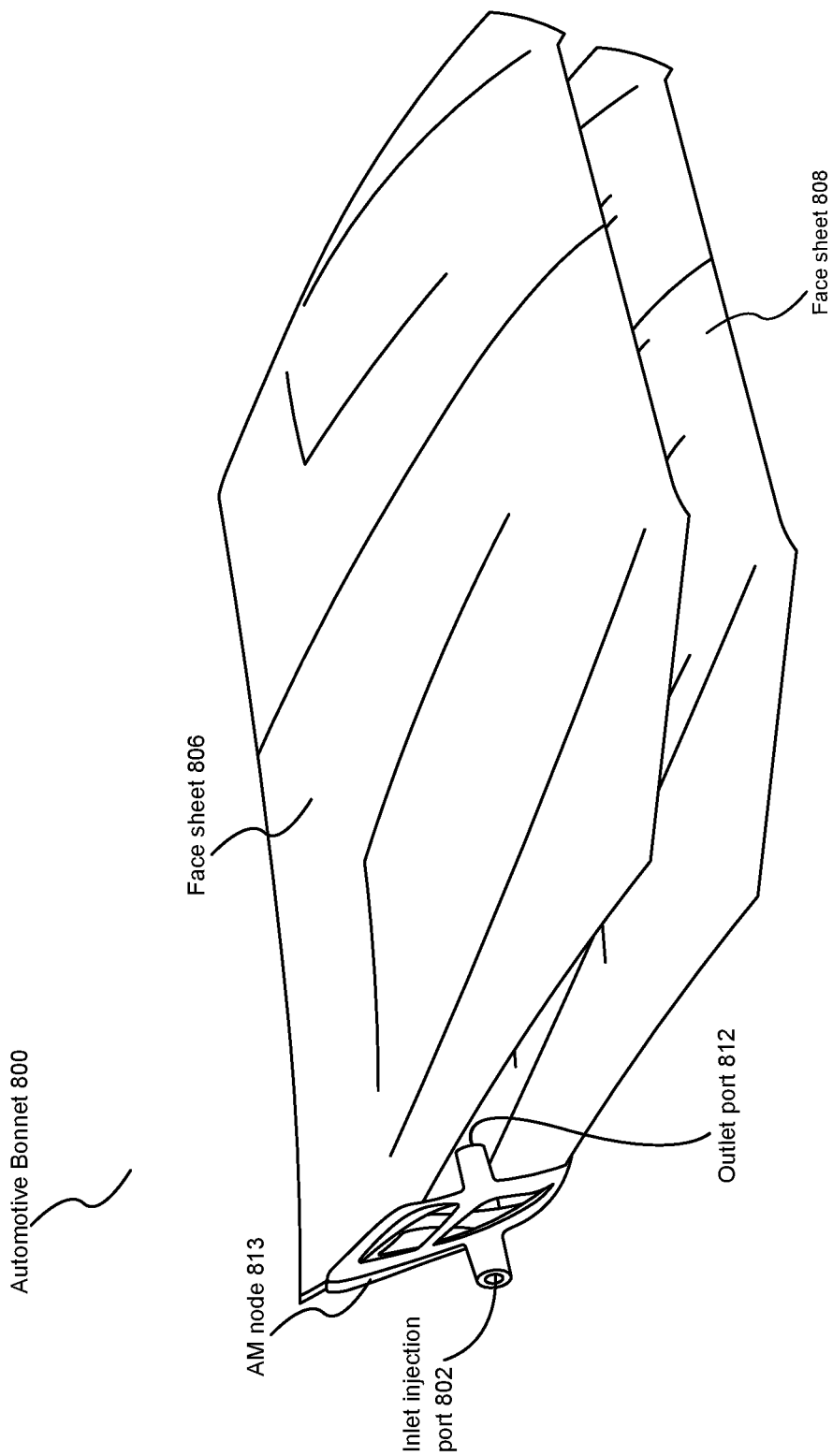
FIG. 8 is a perspective view of an automotive bonnet secured via an additively manufactured node in accordance with an embodiment.

FIG. 8 is a perspective view of an automotive bonnet 800 secured via an additively manufactured node 813 in accordance with an embodiment. The bonnet or hood 800 includes face sheets 806 and 808. In addition to having the properties needed to meet structural requirements (e.g., pedestrian safety requirements), bonnet 800 may be aesthetically contoured by shaping the face sheets 806 and 808. In this embodiment, the foam inlet injection port 802 is arranged on the side to facilitate ease of injection and to stay removed from critical vehicle functions. If necessary to ensure enough foam can be provided, the bonnet 800 in some embodiments may include a similar injection port on the other side (obscured from view). Corresponding outlet ports 812 and one on the opposing obscured side can supply foam to the interior region between face sheets 806 and 808. The node 813 in this case is relatively simple and may serve as an interconnect between the hood and other parts of the vehicle. In alternative embodiments, additional interior paneling may be coupled to the bonnet 800 using the bridge nodes and single and double shear nodes and interfaces as described herein.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other techniques for providing interfaces between parts. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A node, comprising;
    a base comprising a length of material having a first end and a second end;
    a first interface proximate to the first end, the first interface engaging a face sheet edge of a first face sheet while being separated from the face sheet edge of the first face sheet by a first set of isolating structures abutting at least two surfaces of the first face sheet edge;
    a second interface proximate to the second end, the second interface engaging a face sheet edge of a second face sheet while being separated from the face sheet edge of the second face sheet by a second set of isolating structures abutting at least two surfaces of the second face sheet edge, such that the first and second face sheets oppose one another; and
    a foam inlet port arranged on the base, the foam inlet port configured to enable a flow of a substance into an area defined by at least the first and second face sheets.

2. The node of claim 1, wherein the first face sheet and the second face sheet occupy, at least in part, planes parallel to one another.

3. The node of claim 1, wherein the first and second interfaces comprise single-shear interfaces.

4. The node of claim 1, wherein the first and second interfaces comprise double-shear interfaces.

5. The node of claim 1, wherein the first set of isolating structures includes a washer.

6. The node of claim 5, wherein the washer is a nylon washer.

7. The node of claim 1, wherein the first set of isolating structures comprises an electrically-insulating material.

* * * * *